E. FISHER.

MACHINES FOR SHEARING BOILER-PLATES

No. 7,201. Reissued July 4. 1876.

WITNESSES:

C. Neveux

Alex F. Roberts

INVENTOR:

Ebenezer Fisher

BY

ATTORNEYS.

N. PETERS, PHOTO-LITHOGRAPHER, WASHINGTON, D. C.

UNITED STATES PATENT OFFICE.

EBENEZER FISHER, OF KINCARDINE, CANADA.

IMPROVEMENT IN MACHINES FOR SHEARING BOILER-PLATES.

Specification forming part of Letters Patent No. 171,655, dated January 4, 1876; reissue No. 7,201, dated July 4, 1876; application filed May 13, 1876.

*To all whom it may concern:*

Be it known that I, EBENEZER FISHER, of Kincardine, in the Province of Ontario, Dominion of Canada, have invented a new and Improved Boiler-Plate Clipper for Cutting Bevel Edge on Boiler-Plate or Bar-Iron, of which the following is a specification:

My invention consists of a stationary and a movable shear for clipping a bevel edge on boiler-plate or bar-iron, the edge of the stationary shear being arranged in a plane so inclined to the movable shear, and the movable shear obliquely arranged or inclined toward the stationary cutter, that the edge of the plate being cut is beveled suitably for calking, and, at the same time, the front or face of the machine is so inclined that the plate to be clipped lies flat or horizontally on the stationary cutter, so that it can be operated to better advantage than it could be if the front or face of the machine stood upright. The cam which works the lever of the movable cutter is so contrived as to allow the cutter to remain as long as possible when raised to facilitate the adjusting of the plate.

Figure 1:
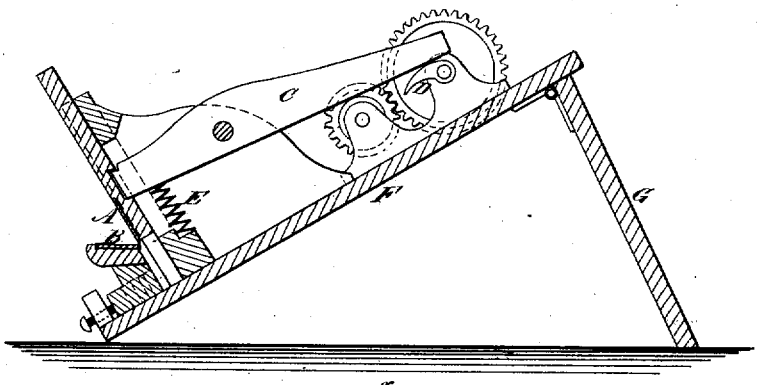
Figure 2:
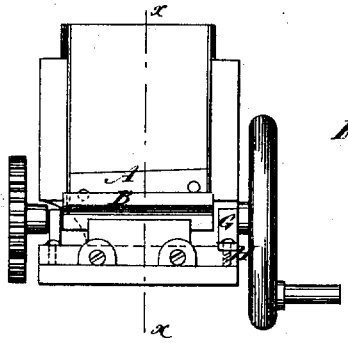
Figure 3:
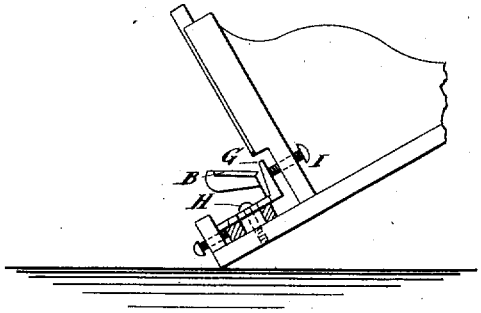

Figure 1 is a sectional view of my improved machine. Fig. 2 is a front elevation; and Fig. 3 is a detail, partly in side elevation and partly in section.

Similar letters of reference indicate corresponding parts.

A is the movable cutter; B, the stationary one; C, the lever; D, the cam, and E a spring for raising the movable cutter. Cutter B is inclined, as shown, to the other one, to bevel the edges of the plates suitably for calking; and in order that the plate and cutter B may have a horizontal position, the machine is tilted up at the rear end of the bed-plate F by the standard G. The cam is convex at the back, so as to let the lever travel on it, and is so contrived as to let the lever fall back to raise cutter A as quick as possible, and remain elevated, to afford as much time as can be during each revolution to shift the plates. G is a gage to regulate the position of the plates when presented to the cutters. It is formed with a slot, and shifts along the screw H, which holds it in position, and is itself adjusted by the screw I, which also supports it against the shocks of the plates.

Having thus described my invention, I claim as new and desire to secure by Letters Patent—

The combination of movable cutter A, obliquely arranged or inclined toward the stationary cutter B, and the edge of the stationary cutter B, at an angle so inclined to the movable cutter A as to cause a bevel edge to be cut thereby, and, at the same time, to have stationary cutter B lie in a horizontal position, so that the plate or bar to be clipped lies flat or horizontally on cutter B, as shown, and for the purpose herein specified.

EBENEZER his × mark. FISHER.

Witnesses:
J. W. DRISCOLL,
W. CLIFTON LOSCOMBE.